US012055460B1

(12) United States Patent
Zhou et al.

(10) Patent No.: US 12,055,460 B1
(45) Date of Patent: Aug. 6, 2024

(54) TOOL AND METHOD FOR MEASURING PARALLELISM AND ANGLE OF SHANK SKELETON OF VEHICLE CRASH DUMMY

(71) Applicants: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

(72) Inventors: Hua Zhou, Tianjin (CN); Zhixin Liu, Tianjin (CN); Weidong Liu, Tianjin (CN); Yongqiang Wu, Tianjin (CN); Mai Yao, Tianjin (CN); Kai Wang, Tianjin (CN); Hanxiao Zhang, Tianjin (CN)

(73) Assignees: CHINA AUTOMOTIVE TECHNOLOGY AND RESEARCH CENTER CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/529,316

(22) Filed: Dec. 5, 2023

(30) Foreign Application Priority Data

Jul. 12, 2023 (CN) .......................... 202310847462.6

(51) Int. Cl.
*G01B 7/30* (2006.01)
*G01M 17/007* (2006.01)
*G09B 23/10* (2006.01)

(52) U.S. Cl.
CPC .......... *G01M 17/0078* (2013.01); *G01B 7/30* (2013.01); *G09B 23/10* (2013.01)

(58) Field of Classification Search
None
See application file for complete search history.

(56) References Cited

U.S. PATENT DOCUMENTS

2007/0251327 A1* 11/2007 Broene ..................... G01N 3/32
73/769
2022/0164643 A1* 5/2022 Charnock ................ G06N 3/04

FOREIGN PATENT DOCUMENTS

CN 102661841 A 9/2012
CN 202661024 U 1/2013
(Continued)

OTHER PUBLICATIONS

Li et al., Design and dynamics analysis of a wearable lower limb exoskeleton robot test platform, Light Industry Science and Technology, 2019, 35(11), pp. 55-58, dated Dec. 31, 2019.
(Continued)

*Primary Examiner* — Brandi N Hopkins
*Assistant Examiner* — Nigel H Plumb
(74) *Attorney, Agent, or Firm* — Westbridge IP LLC

(57) ABSTRACT

Disclosed are a tool and a method for measuring a parallelism and an angle of a shank skeleton of a vehicle crash dummy. The tool includes: a fixation seat, where a magnetic fastener is arranged on the fixation seat and configured to mount a shank U-shaped member; and a movement assembly that is configured to drive a measurement assembly to move, so as to change a relative position of a measurement end of the measurement assembly and the shank U-shaped member. The condition that the measurement assembly directly comes into contact with the shank U-shaped member, and damages a surface of the shank U-shaped member is avoided while making an entire measurement process more convenient.

10 Claims, 11 Drawing Sheets

(56) References Cited

FOREIGN PATENT DOCUMENTS

| | | |
|---|---|---|
| CN | 202904011 U | 4/2013 |
| CN | 205359481 U | 7/2016 |
| CN | 206324784 U | 7/2017 |
| CN | 208968833 U | 6/2019 |
| CN | 209181760 U | 7/2019 |
| CN | 211121060 U | 7/2020 |
| CN | 111568612 A | 8/2020 |
| CN | 114001980 A | 2/2022 |
| CN | 217005689 U | 7/2022 |
| CN | 217275967 U | 8/2022 |
| CN | 115980640 A | 4/2023 |
| DE | 19729454 A1 | 1/1999 |
| FR | 2932373 A1 | 12/2009 |
| WO | 2022217318 A1 | 10/2022 |

OTHER PUBLICATIONS

Li et al., Design and Dynamics Analysis of Test Platform for Wearable Lower Limb Exoskeleton Robot, Progress in Biomedical Engineering, 2022, 43(2), pp. 63-67, dated Dec. 31, 2022.
Notification to Grant Patent Right for Invention issued in counterpart Chinese Patent Application No. 202310847462.6, dated Aug. 16, 2023.

\* cited by examiner

TOOL AND METHOD FOR MEASURING PARALLELISM AND ANGLE OF SHANK SKELETON OF VEHICLE CRASH DUMMY

CROSS-REFERENCE TO RELATED APPLICATIONS

The present application claims priority to Chinese Patent Application No. 202310847462.6, filed on Jul. 12, 2023 and entitled "Tool and Method for Measuring Parallelism and Angle of Shank Skeleton of Vehicle Crash Dummy", the content of which is incorporated herein by reference in its entirety.

TECHNICAL FIELD

The present disclosure generally relates to the technical field of vehicle safety crash tests, in particular to a tool and a method for measuring a parallelism and an angle of a shank skeleton of a vehicle crash dummy.

BACKGROUND

A vehicle crash dummy is crucial to the development of vehicle safety performance as an essential tool in a vehicle crash test. An existing vehicle crash dummy has a complex skeleton structure, and includes a shank U-shaped member to be welded. The shank U-shaped member of the crash dummy has a special structure with splints at two sides to be welded to a base. However, parts are likely to deform during welding, and their tolerance accuracy will be affected accordingly. In addition, it is difficult to accurately measure geometric tolerances including an angle of the base and a parallelism of the splints at two sides of the U-shaped member efficiently. And a parallelism measurement surface is connected to a knee sensor, and an angle measurement surface is connected to a tibia sensor. As a result, parallelism and angle deviations are likely to lead to the unreliability of overall measurement data of the sensor of the crash dummy eventually and affect the accuracy of the vehicle crash test if not found in time.

At present, the U-shaped member is mainly measured in contact and non-contact manners. In the case of the contact manner, a surface of a workpiece is likely to be damaged since it directly comes into contact with a measurement tool, which makes it impossible to satisfy test requirements in terms of precision. When the non-contact manner is used, a measurement apparatus cannot be reasonably mounted due to size limitation of the U-shaped workpiece to be measured. In view of this, a tool and a method for measuring a parallelism and an angle of a shank skeleton of a vehicle crash dummy are provided for solving the above problems.

SUMMARY

In order to solve the above defects or deficiencies in the prior art, a tool and a method for measuring a parallelism and an angle of a shank skeleton of a vehicle crash dummy are to be provided to conveniently and timely measure the parallelism and the angle, improve the machining accuracy of the shank skeleton of the crash dummy and improve a yield.

In a first aspect, the present disclosure provides a tool for measuring a parallelism and an angle of a shank skeleton of a vehicle crash dummy. The tool includes:
a fixation seat, where a magnetic fastener is arranged on the fixation seat and configured to mount a shank U-shaped member; the shank U-shaped member includes a base and a first splint and a second splint that are arranged on the base, the magnetic fastener has a standard angle, and the base has a preset angle; and under the condition that the base is mounted on a surface of the fixation seat, a surface, far away from the fixation seat, of the base forms a prediction plane;
a measurement assembly, where the measurement assembly is provided with a first measurement end and a second measurement end, measurement directions of the first measurement end and the second measurement end are perpendicular to each other, and the measurement direction of the first measurement end is perpendicular to a bottom surface of the magnetic fastener; and
a movement assembly, where the movement assembly is arranged between the measurement assembly and the fixation seat, and the movement assembly is provided with a drive end that is connected to the measurement assembly and configured to drive the measurement assembly to move, so as to change relative positions of the first measurement end and the base corresponding thereto, and of the second measurement end and the first splint or the second splint corresponding thereto.

In a second aspect, the present disclosure provides a method for measuring a parallelism and an angle of a shank skeleton of a vehicle crash dummy implemented based on the tool described above. The method includes:
driving, by a movement assembly, a measurement assembly to move in a first direction and towards a side close to a fixation seat, measuring a real-time distance between a first measurement end and a prediction plane and outputting a first curve by the first measurement end, and measuring a real-time distance between a second measurement end and a first splint and outputting a second curve by the second measurement end, where the first direction and a bottom surface of the fixation seat are arranged in parallel;
driving, by the movement assembly, the measurement assembly to move in a second direction and towards a side far away from a base, and simultaneously measuring a real-time distance between the second measurement end and the first splint and outputting a third curve by the second measurement end, where the second direction is perpendicular to the first direction;
causing the measurement assembly to rotate clockwise by 180°, driving, by the movement assembly, the measurement assembly to move in the second direction and towards a side close to the base, and measuring a real-time distance between the second measurement end and a second splint and outputting a fourth curve by the second measurement end;
driving, by the movement assembly, the measurement assembly to move in the first direction and towards a side far away from the fixation seat, and measuring a real-time distance between the second measurement end and the second splint and outputting a fifth curve by the second measurement end;
obtaining an ideal datum plane;
computing five parallelism errors according to the first curve, the second curve, the third curve, the fourth curve and the fifth curve by taking the ideal datum plane as a datum; and
determining that a preset angle is equal to a standard angle and the first splint and the second splint are parallel to the ideal datum plane respectively when all parallelism errors fall within a parallelism tolerance interval.

To sum up, the present disclosure discloses a specific structure of a tool for measuring a parallelism and an angle of a shank skeleton of a vehicle crash dummy. According to the present disclosure, the magnetic fastener is arranged on the fixation seat for mounting the shank U-shaped member. The shank U-shaped member includes the base and the first splint and the second splint that are arranged on the base, the magnetic fastener has the standard angle, and the base has the preset angle; and under the condition that the base is mounted on the surface of the fixation seat, the surface, far away from the fixation seat, of the base forms the prediction plane. The tool further includes: the measurement assembly, where the measurement assembly is provided with the first measurement end and the second measurement end, the measurement directions of the first measurement end and the second measurement end are perpendicular to each other, and the measurement direction of the first measurement end is perpendicular to the bottom surface of the magnetic fastener; and the movement assembly that is arranged between the measurement assembly and the fixation seat, where the movement assembly is provided with the drive end that is connected to the measurement assembly and configured to drive the measurement assembly to move, so as to change relative positions of the first measurement end and the base and of the second measurement end and the first splint or the second splint.

According to the present disclosure, through cooperation of the measurement assembly and the movement assembly, the first measurement end and the second measurement end may measure the real-time distance between the first measurement end and the corresponding prediction plane, and the real-time distance between the second measurement end and each of the first splint and the second splint respectively. The angle tolerance that is difficult to measure accurately is converted into the parallelism tolerance that is easy to measure, such that whether the angle tolerance satisfies standards is indirectly determined, that is, the angle of the base and the parallelisms of the two splints can be measured quickly, and the condition that the measurement assembly directly comes into contact with the shank U-shaped member, and damages the surface of the member is avoided while making an entire measurement process more convenient and rapid.

BRIEF DESCRIPTION OF THE DRAWINGS

Other features, objectives, and advantages of the present disclosure will become more apparent by reading the detailed description of non-limitative examples with reference to the following accompanying drawings.

FIG. 3a is an enlarged schematic diagram of portion A in FIG. 2a.

FIG. 4 is an enlarged schematic diagram of portion B in FIG. 2a.

DETAILED DESCRIPTION OF THE EMBODIMENTS

The present disclosure will be further described in detail below with reference to accompanying drawings and in conjunction with examples. It can be understood that particular examples described herein are merely used to explain relevant disclosure, rather than limit the present disclosure. In addition, it should be further noted that merely the parts related to the present disclosure are shown in the accompanying drawings for the convenience of description.

It should be noted that examples in the present disclosure and features therein can be combined with one another if there is no conflict. The present disclosure will be described in detail below with reference to the accompanying drawings and in conjunction with the examples.

Example 1

Figure 2A:
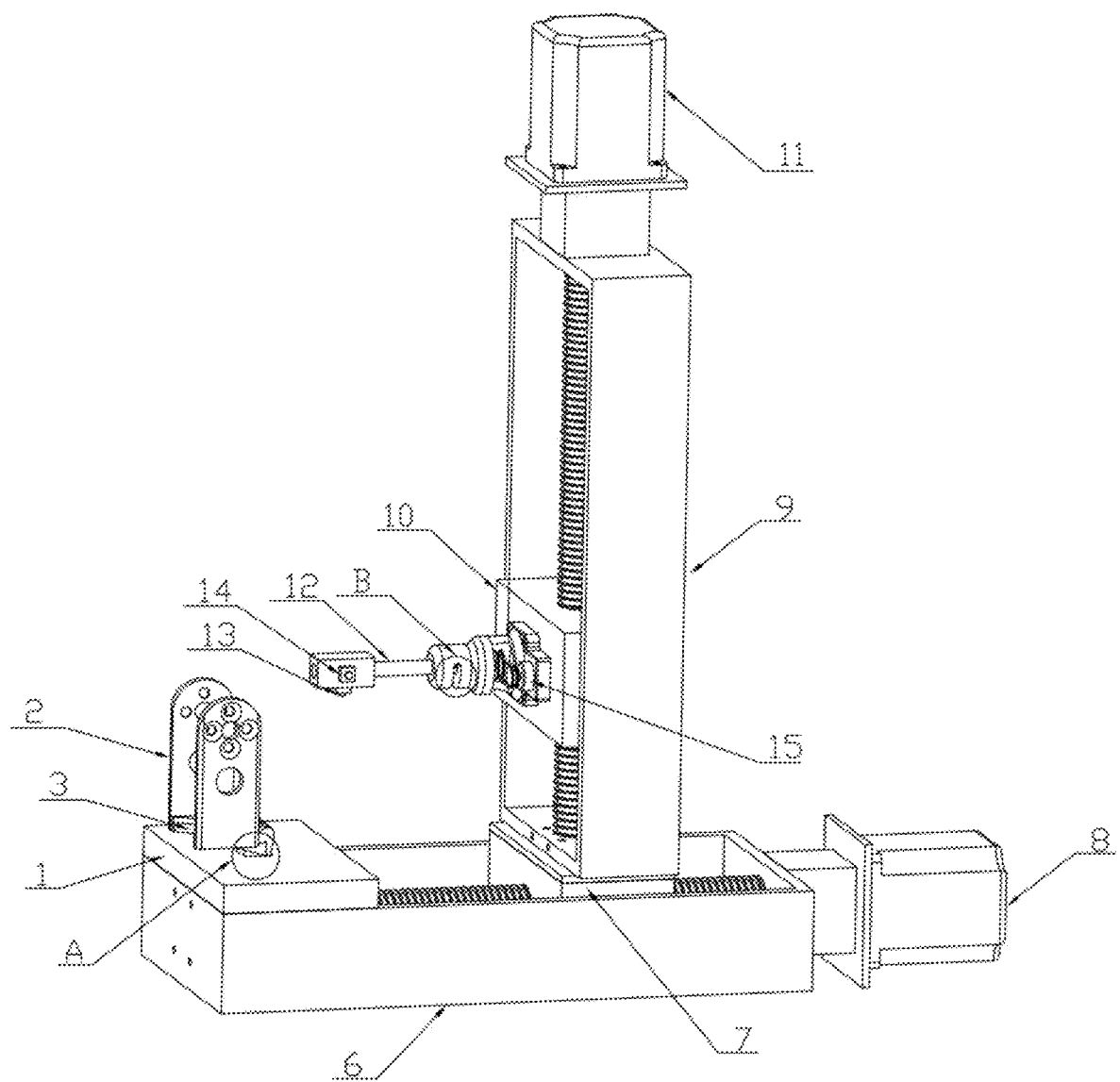
FIG. 2a is a first schematic diagram of an overall structure of a tool for measuring a parallelism and an angle of a shank skeleton of a vehicle crash dummy.
Figure 2B:
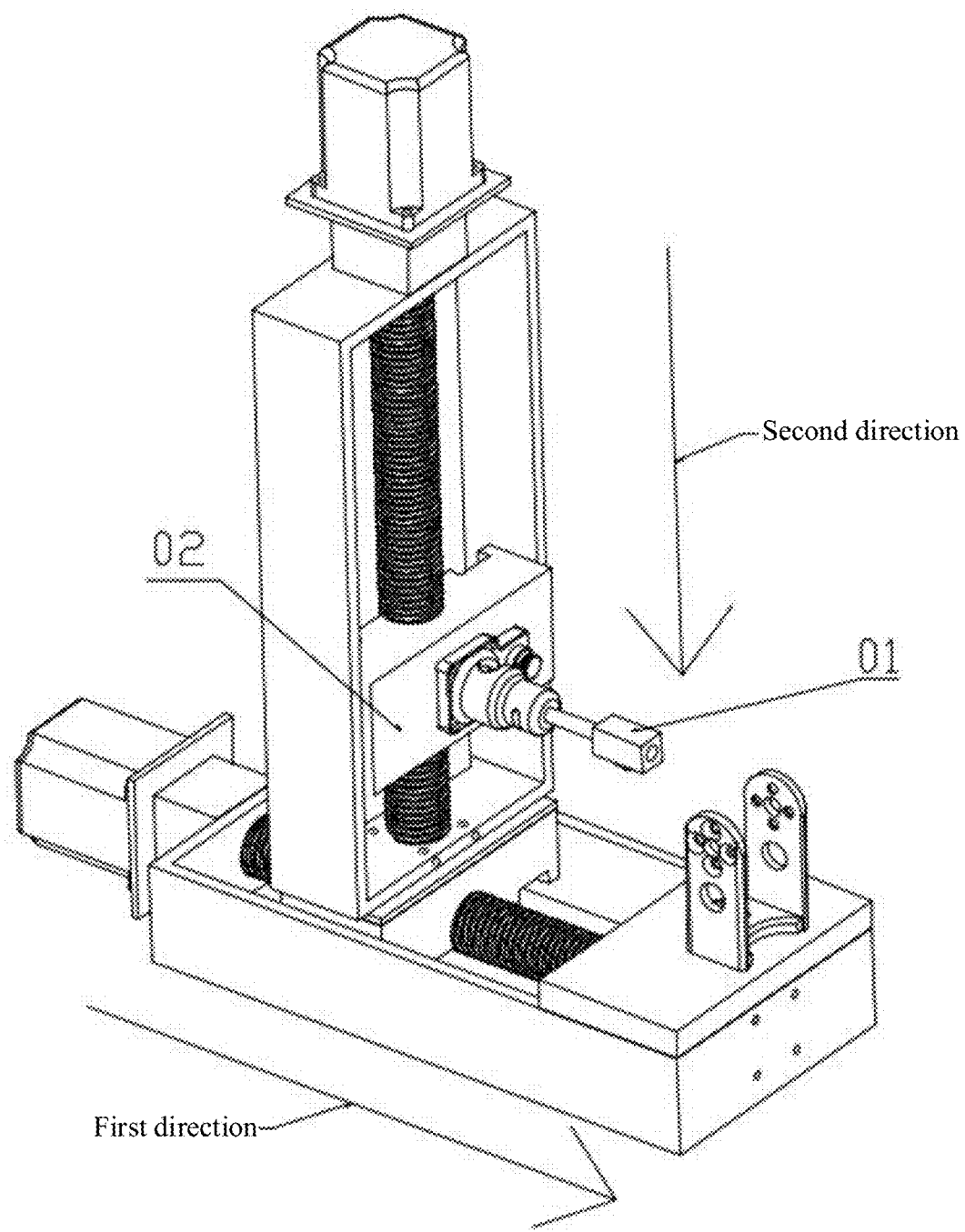
FIG. 2b is a second schematic diagram of an overall structure of a tool for measuring a parallelism and an angle of a shank skeleton of a vehicle crash dummy.
Figure 6A:
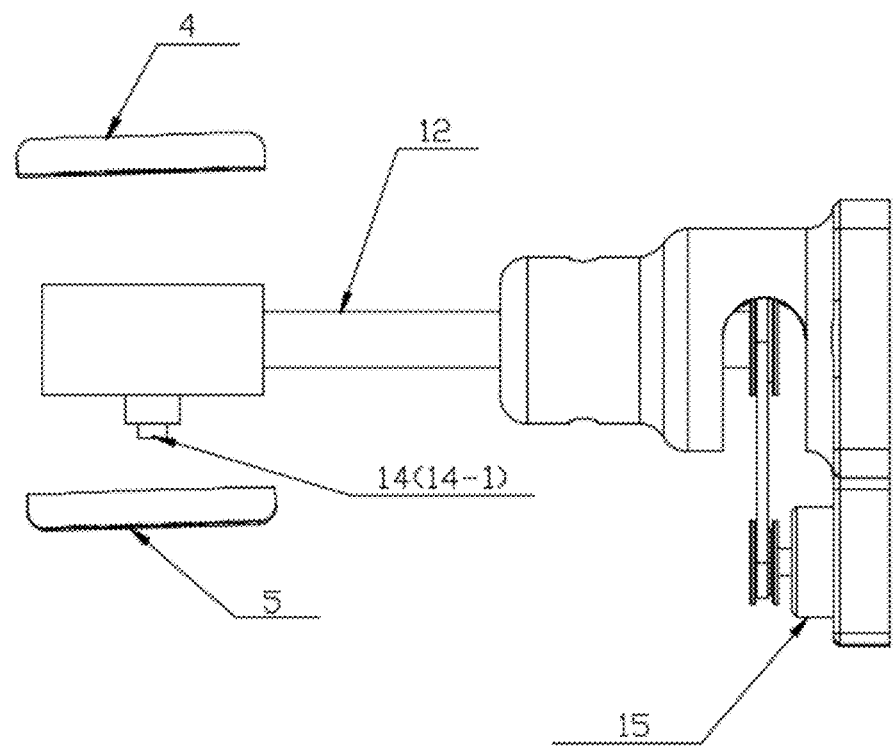
FIG. 6a is a schematic structural diagram when a second distance measurement member measures a distance between the second distance measurement member and a first splint or a second splint.

The present disclosure provides a tool for measuring a parallelism and an angle of a shank skeleton of a vehicle crash dummy. As shown in FIGS. 2a and 2b, the tool includes:

a fixation seat 1 configured to mount a shank U-shaped member 2, where the shank U-shaped member 2 includes a base 3 and a first splint 4 and a second splint 5 that are arranged on the base 3. In this case, the first splint 4 and the second splint 5 are the same kind of splint, and are defined as the first splint 4 and the second splint 5 for the convenience of distinguishing a certain splint when a second measurement end measures a distance between the second measurement end and the certain splint, as shown in FIG. 6a.

As shown in FIG. 2a, the fixation seat 1 is a pedestal connected to a side, far away from a first drive member 8, of a first guide rail 6. A magnetic fastener 17 is arranged on the pedestal, and the magnetic fastener 17 is magnetic and may attract the base 3, so as to facilitate mounting and fixation of the base 3, as shown in FIG. 3c. The magnetic fastener 17 has a standard angle α which may be 16°. The base 3 has a preset angle β. When the base 3 is mounted on a surface of the fixation seat 1, a surface, far away from the fixation seat 1, of the base 3 forms a prediction plane 3-1. In this case, the prediction plane 3-1 refers to the surface of the base 3 that is relatively far away from the fixation seat 1 and may be measured by a first measurement end.

Figure 3A:
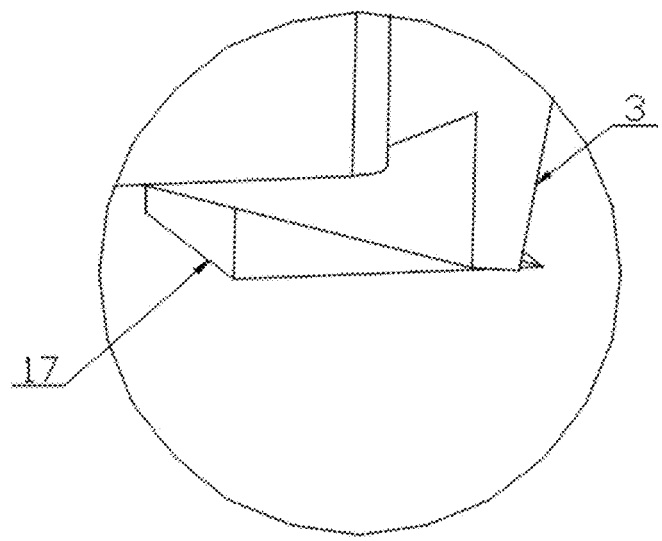
Figure 3B:
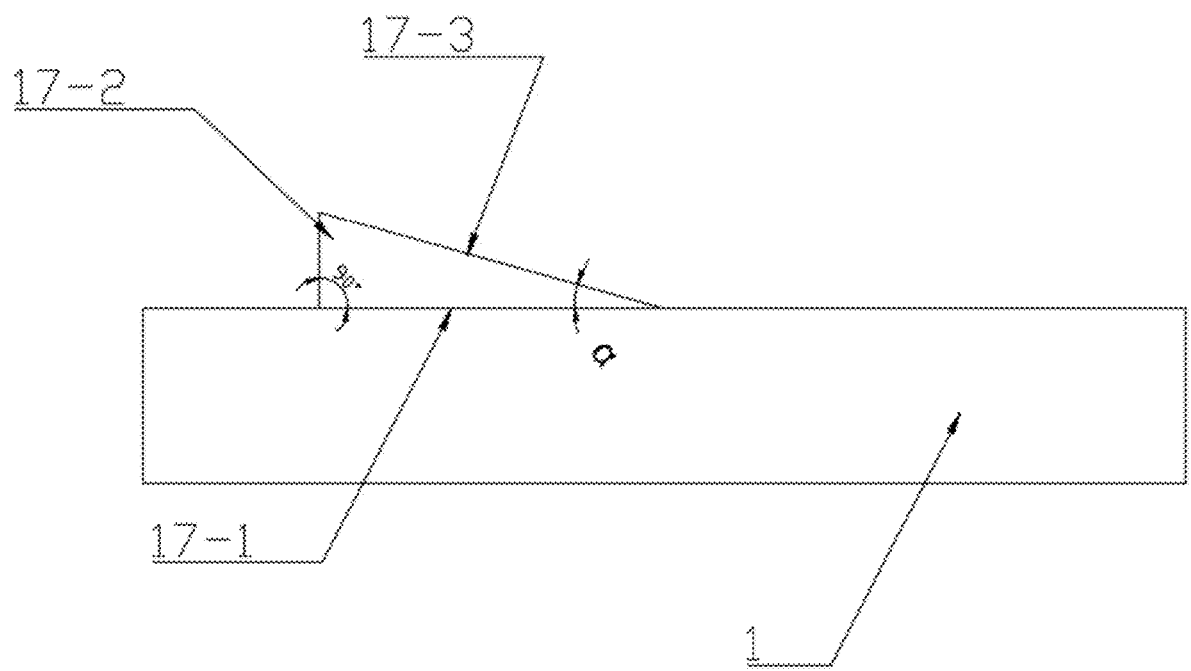
FIG. 3b is a schematic structural diagram of a magnetic fastener.
Figure 3C:
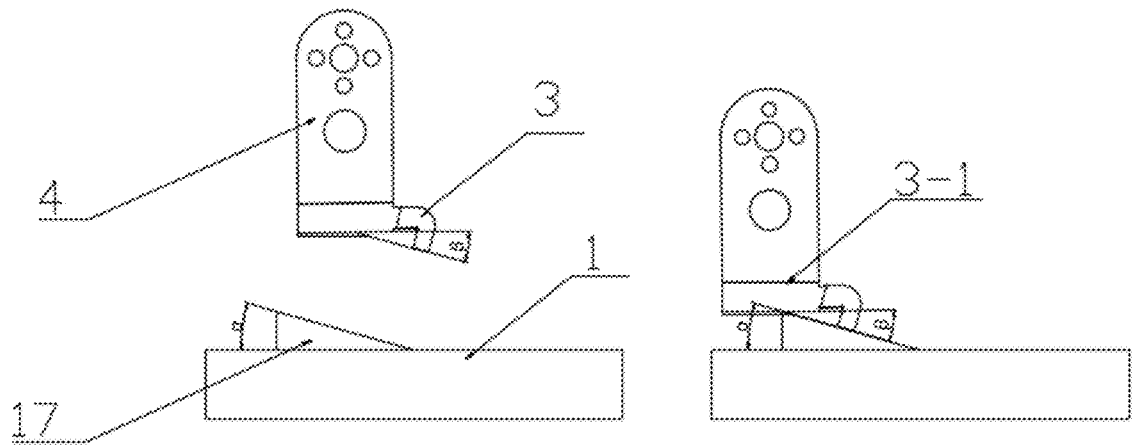
FIG. 3c is a schematic diagram before and after a shank U-shaped member and a magnetic fastener cooperate.

Specifically, as shown in FIGS. 3a and 3b, the magnetic fastener 17 includes:

a first straight wall 17-1, a second straight wall 17-2 and a third straight wall 17-3 that are connected in sequence, where a first included angle is formed between the first straight wall 17-1 and the second straight wall 17-2, the first included angle is 90°, and an opening of the first included angle faces the third straight wall 17-3; and a second included angle is formed between the first straight wall 17-1 and the third straight wall 17-3, the second included angle is the standard angle α, and an opening of the first included angle faces the second straight wall 17-2.

The base 3 has a preset included angle, and the preset included angle is the preset angle β. In this case, the preset included angle of the base 3 is formed between a bottom surface of the base 3 and an upper surface of the base 3 for mounting the first splint 4 and the second splint 5.

When the base 3 is mounted on the magnetic fastener 17, an opening of the preset angle faces a second guide rail 9, the bottom surface of the base 3 is in surface contact with the third straight wall 17-3, and a surface, far away from the magnetic fastener 17, of the base 3 forms the above prediction plane 3-1. In addition, when the prediction plane 3-1 is parallel to an ideal datum plane and a bottom surface of the magnetic fastener 17, the second included angle α and the preset angle β are a pair of alternate interior angles.

The tool further includes a measurement assembly 01, where the measurement assembly is configured to measure a real-time distance between the measurement assembly and each of the prediction plane 3-1, the first splint 4 or the second splint 5, the measurement assembly 01 is provided with a first measurement end 13-1 and a second measurement end 14-1, measurement directions of the first measurement end 13-1 and the second measurement end 14-1 are perpendicular to each other, and the measurement direction of the first measurement end 13-1 is perpendicular to the bottom surface of the magnetic fastener 17; and a movement assembly 02, where the movement assembly is arranged between the measurement assembly 01 and the fixation seat 1, and the movement assembly 02 is provided with a drive end 18 that is connected to the measurement assembly 01 and configured to drive the measurement assembly 01 to move, so as to change relative positions of the first measurement end 13-1 and the base 3 and of the second measurement end 14-1 and the first splint 4 or the second splint 5.

Figure 8:
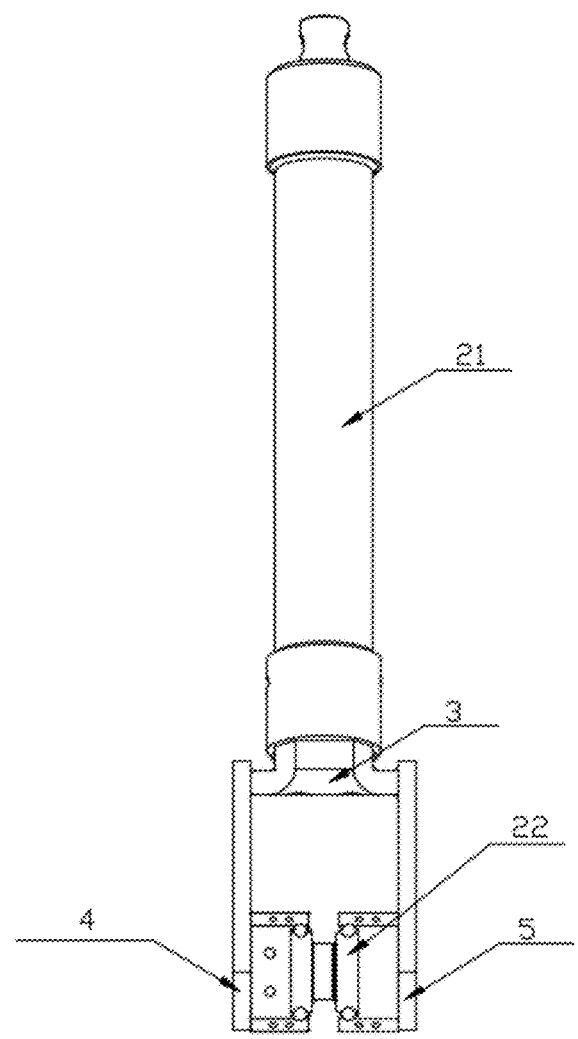
FIG. 8 is a schematic diagram of an overall structure of a shank U-shaped member.
Figure 9:
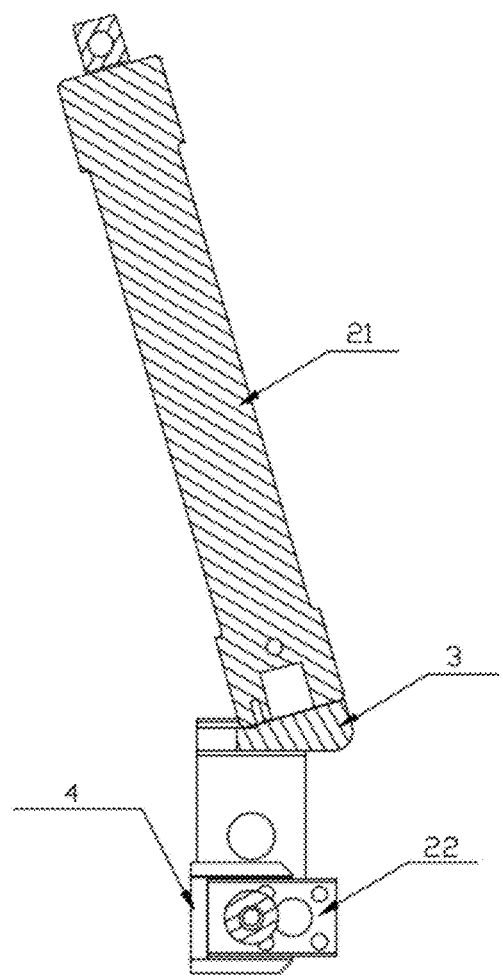
FIG. 9 is a sectional view of a shank U-shaped member.

As shown in FIGS. 8 and 9, the prediction plane 3-1 of the base 3 is connected to a tibia sensor 21. Two opposite surfaces of the first splint 4 and the second splint 5 are connected to a knee sensor 22 respectively.

Figure 10:
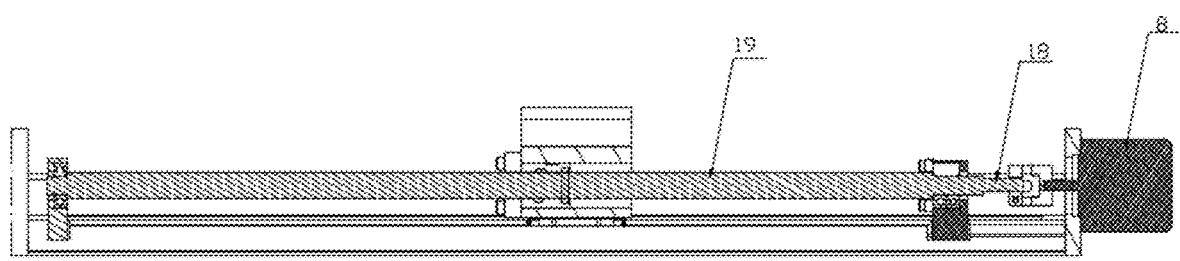
FIG. 10 is a schematic diagram showing a connection between a first drive member and a first screw.

Further, as shown in FIG. 2*a*, the movement assembly 02 includes:

a first guide rail 6, where the first guide rail is arranged in a first direction and mounted at a bottom of the fixation seat 1, and the first direction is arranged parallel to a bottom surface of the fixation seat 1; and the first guide rail 6 is in a rectangular recess structure, and is formed by a bottom plate and four rectangular side plates that are arranged on the bottom plate and connected in sequence; and the rectangular side plates are perpendicular to the bottom plate;

a first slide block 7, where the first slide block is movably arranged on the first guide rail 6 and configured to mount the measurement assembly 01; and a first drive member 8, where the first drive member is arranged at a side, relatively far away from the fixation seat 1, of the first guide rail 6; as shown in FIG. 10, a drive end 18 of the first drive member 8 is provided with a first screw 19, the first screw 19 corresponds to and is arranged parallel to the first guide rail 6, and the first slide block 7 is in threaded connection to the first screw 19; and in this case, a type of the first drive member 8 includes, for example, a drive motor having a model including KY80AS0202-15.

The drive end 18 of the first drive member 8 drives the first screw 19 to rotate. Since the two rectangular side plates of the first guide rail 6 in a guide direction have a restrictive effect on the first slide block 7, the first slide block 7 can be prevented from rotating around the first screw 19 and can move along the first screw 19, that is, in the first direction, so as to change relative positions in the first direction of the first measurement end 13-1 and the base 3 and of the second measurement end 14-1 and the first splint 4 or the second splint 5.

Figure 11:
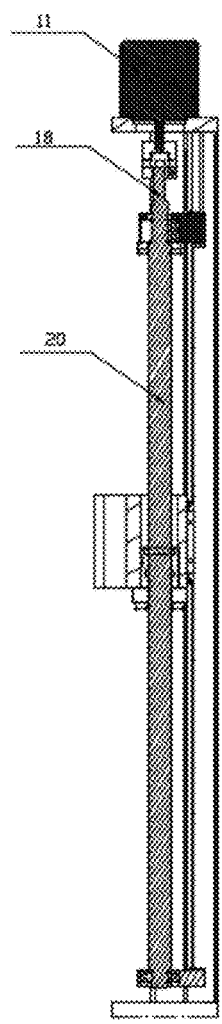
FIG. 11 is a schematic diagram showing a connection between a second drive member and a second screw.

Further, as shown in FIG. 2*a*, the movement assembly 02 further includes:

a second guide rail 9, where the second guide rail is arranged in a second direction and mounted on the first slide block 7, and the second direction is perpendicular to the first direction;

the first slide block 7 may drive the second guide rail 9 to move in the first direction when moving, and the second guide rail 9 is a rectangular recess structure, and is formed by a bottom plate and four rectangular side plates that are arranged on the bottom plate and connected in sequence; and the rectangular side plates are perpendicular to the bottom plate;

a second slide block 10, where the second slide block is movably arranged on the second guide rail 9 and configured to mount the measurement assembly 01; and a second drive member 11, where the second drive member is arranged at a side, relatively far away from the first slide block 7, of the second guide rail 9; as shown in FIG. 11, a drive end 18 of the second drive member 11 is provided with a second screw 20, the second screw 20 corresponds to and is arranged parallel to the second guide rail 9, and the second slide block 10 is in threaded connection to the second screw 20; and in this case, a type of the second drive member 11 includes, for example, a drive motor having a model including KY80AS0202-15.

The drive end 18 of the second drive member 11 drives the second screw 20 to rotate. Since the two rectangular side plates of the second guide rail 9 in a guide direction have a restrictive effect on the second slide block 10, the second slide block 10 can be prevented from rotating around the second screw 20 and can move along the second screw 20, that is, in the second direction, so as to change relative positions in the second direction of the first measurement end 13-1 and the base 3 and of the second measurement end 14-1 and the first splint 4 or the second splint 5.

Figure 6B:
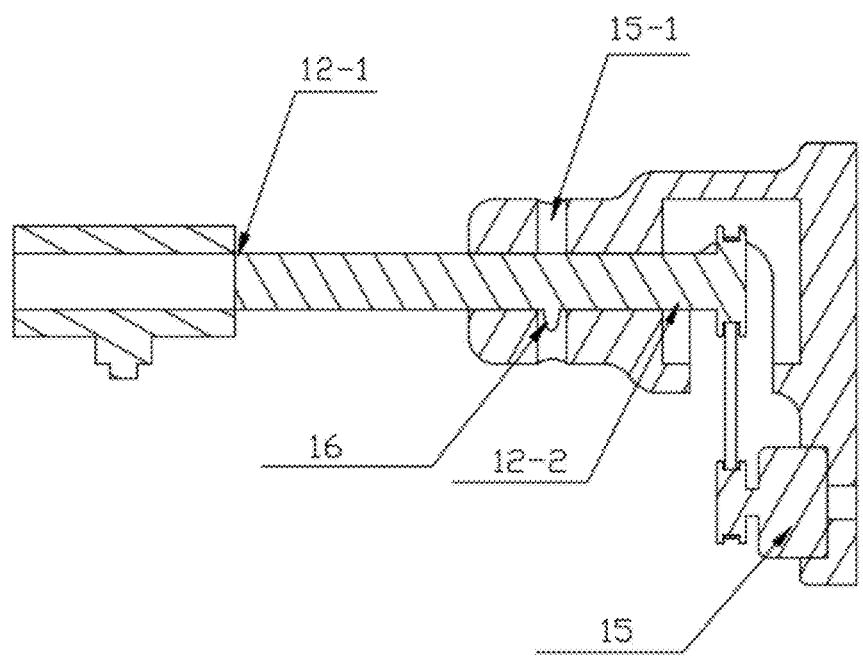
FIG. 6b is a sectional view of a measurement assembly.

Further, as shown in FIGS. 6*a* and 6*b*, the measurement assembly 01 includes:

a mounting shaft 12 provided with a first end 12-1 and a second end 12-2, where the first end 12-1 is, for example, a left end of the mounting shaft 12, and the second end 12-2 is, for example, a right end of the mounting shaft 12 as shown in FIG. 6*b*;

a first distance measurement member 13 and a second distance measurement member 14, where the first distance measurement member and the second distance measurement member are arranged at the first end 12-1, a measurement end of the first distance measurement member 13 is the first measurement end 13-1, and a measurement end of the second distance measurement member 14 is the second measurement end 14-1; and in this case, a type of the first distance measurement member 13 and the second distance measurement member 14 includes, for example, a laser displacement sensor having a model including PANASONIC HG-C1400-P; and a third drive member 15, where the third drive member is arranged at a side, close to the fixation seat 1, of the second slide block 10, and the third drive member 15 is provided with a drive end 18 connected to the second end 12-2.

As shown in FIG. 6a, the third drive member 15 includes a servo motor mounted on the second slide block 10, the servo motor is provided with a drive shaft, and a driving wheel is mounted on the drive shaft; the third drive member 15 further includes a driven wheel arranged at the second end 12-2 of the mounting shaft 12, and the driving wheel is connected to the driven wheel by a belt; and the drive shaft of the servo motor drives the driving wheel to rotate, and the driven wheel is driven by the belt to rotate, such that the mounting shaft 12 rotates, and the first distance measurement member 13 and the second distance measurement member 14 rotate clockwise by 180°.

In this case, a model of the servo motor includes, for example, 40CB010C-500000.

The third drive member 15 may drive the mounting shaft 12 to rotate around its own axis, such that the second measurement end 14-1 is changed to face the first splint 4 or the second splint 5.

Figure 7:
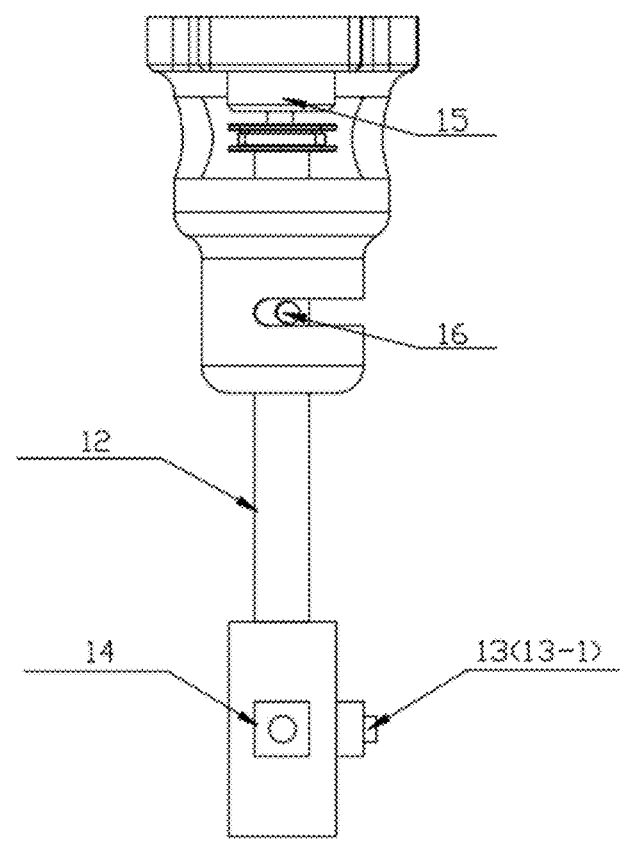
FIG. 7 is a schematic structural diagram of a measurement assembly.

Further, as shown in FIG. 7, the tool further includes:

a limit recess 15-1, where the limit recess is provided on the third drive member 15. As shown in FIG. 6b, the third drive member 15 is provided with a housing covering the driven wheel, the housing is connected to the second slide block 10, and is provided with the limit recess 15-1 and an accommodation recess that are in communication with an interior of the housing, and the accommodation recess may allow the belt to pass therethrough and operate normally. The limit recess 15-1 is arranged far away from the second slide block 10 relative to the accommodation recess. The mounting shaft 12 may penetrate the housing to be connected to the driven wheel, and may maintain normal operation. In this case, an angle formed by a connection line that is between two ends of the limit recess 15-1 and a center point of a cross section of the housing is 180°.

Figure 4:
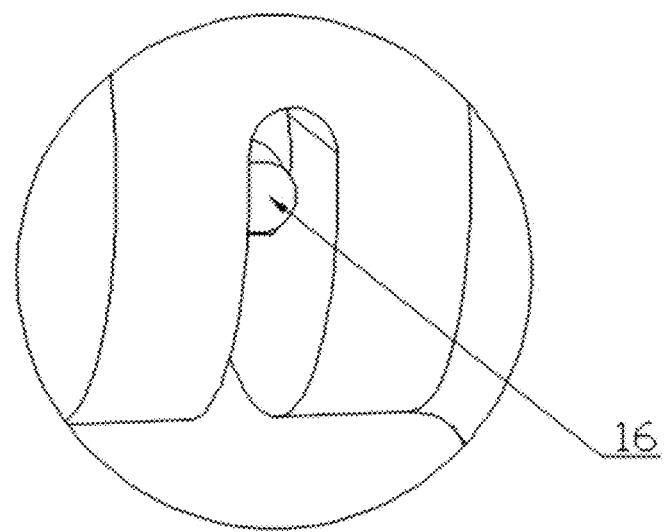

As shown in FIGS. 4 and 6b, a limit protrusion 16 is arranged in the limit recess 15-1, and the limit protrusion 16 is connected to a side wall of the mounting shaft 12 and is configured to limit a rotatable angle of the mounting shaft 12 rotating around its own axis. Specifically, the limit protrusion 16 may rotate along with the mounting shaft 12. When the limit protrusion 16 touches any end side wall of the limit recess 15-1, the mounting shaft 12 is stopped from continuously rotating. In this case, the second measurement end 14-1 just rotates by 180°, and may measure a distance between the second measurement end and an adjacent splint.

Example 2

The present disclosure provides a method for measuring a parallelism and an angle of a shank skeleton of a vehicle crash dummy implemented based on the tool according to Example 1.

Before a parallelism error and an angle error are measured according to the following method, it is necessary to mount a base 3 of a shank U-shaped member 2 to be measured on a fixation seat 1. In addition, it is set that initial positions of a first measurement end 13-1 and a second measurement end 14-1 in a first direction are at a side, relatively close to a drive end 18 of a movement assembly 02, of the base 3, and stop positions of the first measurement end 13-1 and the second measurement end 14-1 in the first direction are at a side, relatively far away from the drive end 18 of the movement assembly 02, of the base 3; and initial positions of the first measurement end 13-1 and the second measurement end 14-1 in a second direction are at a side, relatively close to the base 3, of a first splint 4 or a second splint 5, and stop positions of the first measurement end 13-1 and the second measurement end 14-1 in the second direction are at a side, relatively far away from the base 3, of the first splint 4 or the second splint 5.

Figure 1:
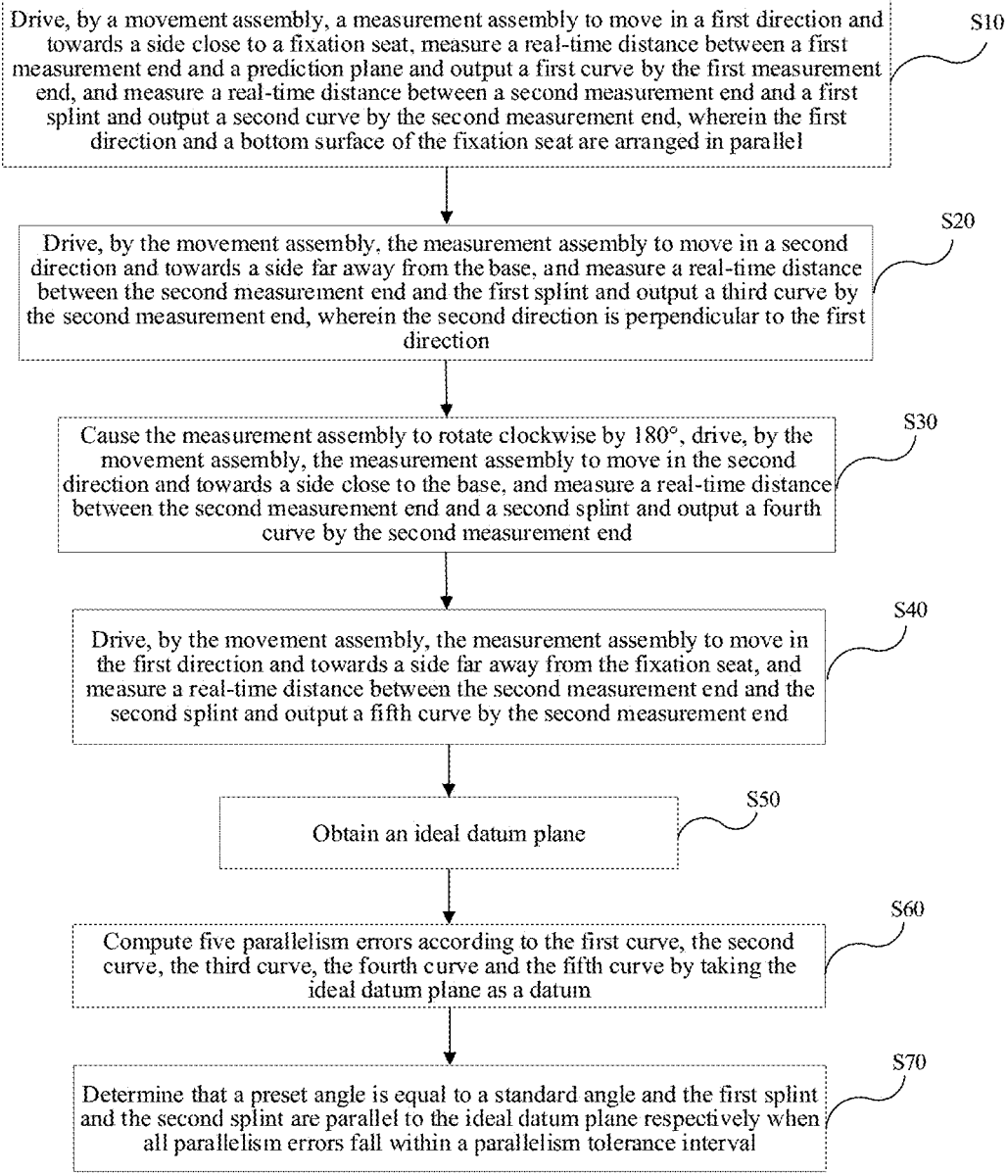
FIG. 1 is a schematic flowchart of a method for measuring a parallelism and an angle of a shank skeleton of a vehicle crash dummy.

As shown in FIG. 1, the method includes:

S10. The movement assembly 02 drives a measurement assembly 01 to move in the first direction and towards a side close to the fixation seat 1, the first measurement end 13-1 measures a real-time distance between the first measurement end and a prediction plane 3-1 and outputs a first curve, and the second measurement end 14-1 measures a real-time distance between the second measurement end and the first splint 4 and outputs a second curve, where the first direction and a bottom surface of the fixation seat 1 are arranged in parallel.

In this case, the real-time distance, measured by the first measurement end 13-1, between the first measurement end and the prediction plane 3-1 is a distance between the first measurement end 13-1 and the prediction plane 3-1 measured by the first measurement end 13-1 when moving from the initial position to the stop position in the first direction. The real-time distance, measured by the second measurement end 14-1, between the second measurement end and the first splint 4 is a distance between the second measurement end 14-1 and the first splint 4 measured by the second measurement end 14-1 when moving from the initial position to the stop position in the first direction.

The first measurement end 13-1 measures once the distance between the first measurement end and the prediction plane 3-1 every set duration, and the set duration is set according to actual demand. In this way, a plurality of discrete distances may be obtained after a period of time, and these discrete distances and corresponding measurement time are input into a controller. The controller outputs a measurement time-distance curve after performing fitting on the distances and corresponding measurement time, and in this case, the first curve is output. A second curve, a third curve, a fourth curve and a fifth curve may also be output according to the above process.

In this case, a type of the controller includes, for example, Programmable Controller MY-26A PLC.

S20. The movement assembly 02 drives the measurement assembly 01 to move in the second direction and towards a side far away from the base 3, and the second measurement end 14-1 measures a real-time distance between the second measurement end and the first splint 4 and outputs the third curve, where the second direction is perpendicular to the first direction. In this case, the real-time distance, measured by the second measurement end 14-1, between the second measurement end and the first splint 4 is a distance between the second measurement end 14-1 and the first splint 4 measured by the second measurement end 14-1 when moving from the initial position to the stop position in the second direction.

S30. The measurement assembly 01 is caused to rotate clockwise by 180°, the movement assembly 02 drives the measurement assembly 01 to move in a second direction and towards a side close to the base 3, and the second measurement end 14-1 measures a real-time distance between the second measurement end and the second splint 5 and outputs the fourth curve. In this case, the real-time distance, measured by the second measurement end 14-1, between the second measurement end and the second splint 5 is a distance between the second measurement end 14-1 and the second splint 5 measured by the second measurement end 14-1 when moving from the initial position to the stop position in the second direction.

S40. The movement assembly 02 drives the measurement assembly 01 to move in the first direction and towards a side far away from the fixation seat 1, and the second measurement end 14-1 measures a real-time distance between the second measurement end and the second splint 5 and outputs the fifth curve. In this case, the real-time distance, measured by the second measurement end 14-1, between the second measurement end and the second splint 5 is a distance between the second measurement end 14-1 and the second splint 5 measured by the second measurement end 14-1 when moving from the initial position to the stop position in the first direction.

S50. An ideal datum plane is obtained.

Figure 5:
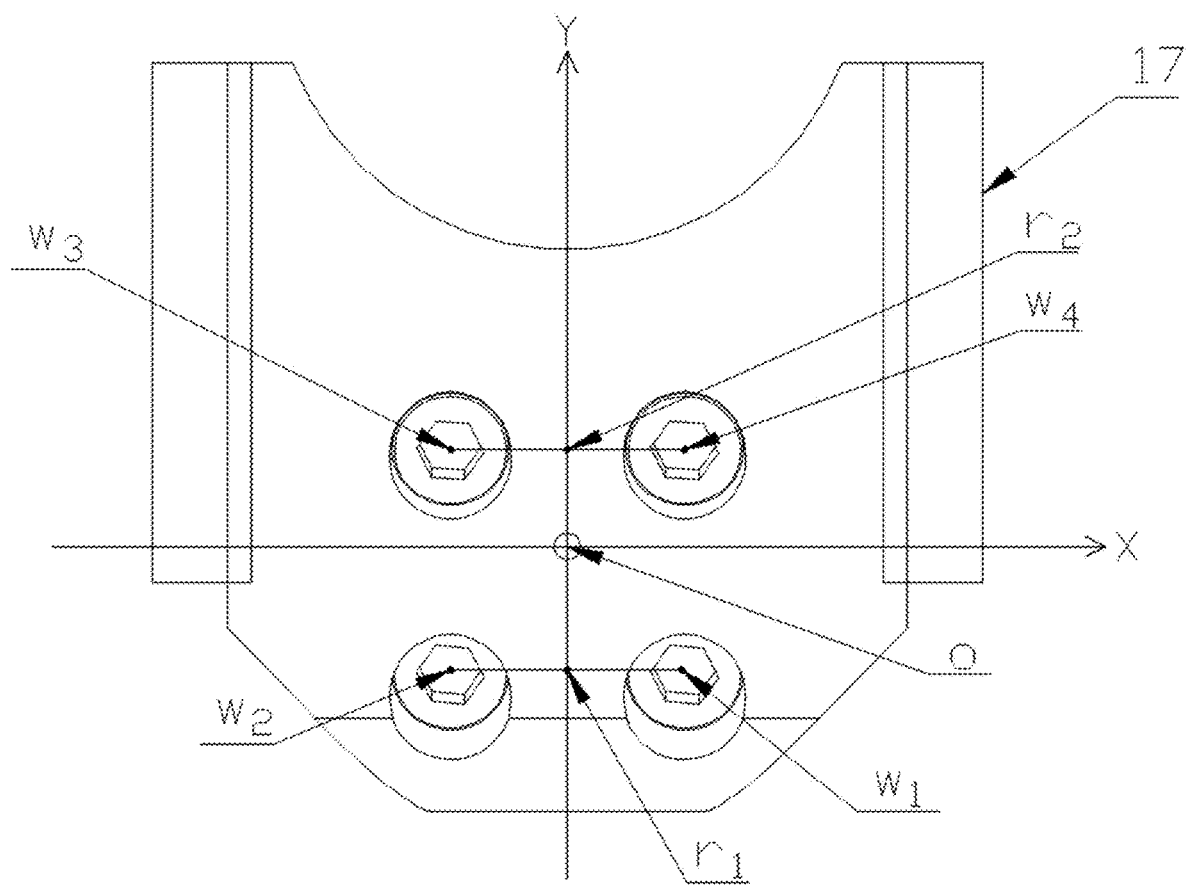
FIG. 5 is a schematic diagram of a three-dimensional coordinate system.

As shown in FIG. 5, the step that an ideal datum plane is obtained specifically includes:

a center of a bottom surface of a magnetic fastener 17 is taken as an origin. As shown in FIG. 5, the origin is point o, an extension line that passes the center of the bottom surface of the magnetic fastener 17 and is perpendicular to the first direction and the second direction is taken as an X axis, an extension line that passes the center of the bottom surface of the magnetic fastener 17 and is parallel to the first direction is taken as a Y axis, an extension line that passes a center of the prediction plane 3-1 and is parallel to the second direction is taken as a Z axis, and a three-dimensional coordinate system is constructed.

In the three-dimensional coordinate system, center coordinate points of four bolt holes on the bottom surface of the magnetic fastener 17 are obtained. As shown in FIG. 5, the center coordinate points of the four bolt holes are $w_1$, $w_2$, $w_3$ and w respectively, and the corresponding coordinates are $(x_1, y_1)$, $(x_2, y_2)$, $(x_3, y_3)$ and $(x_4, y_4)$ in sequence.

Two ideal datum points are computed according to the four center coordinate points, where the ideal datum point is a midpoint coordinate point of a line that is perpendicular to the first direction and the second direction and connects two center coordinate points. As shown in FIG. 5, the two ideal datum points are $r_1$ and $r_2$ respectively, and corresponding coordinates are $(0, y_5)$ and $(0, y_6)$ in sequence.

According to the two ideal datum points, an ideal straight line is obtained. As shown in FIG. 5, the ideal straight line is a line segment formed between $r_1$ and $r_2$.

An ideal datum plane is obtained according to the ideal straight line.

Further, the step that an ideal datum plane is obtained according to the ideal straight line specifically includes:

a coordinate plane where the ideal straight line is located is obtained from the three-dimensional coordinate system.

The ideal straight line is extended in a coordinate axis direction that does not belong to the coordinate plane, and the ideal datum plane is obtained.

As shown in FIG. 5, the coordinate plane where the ideal straight line is located is oXY, and the coordinate axis that does not belong to the coordinate plane is Z axis. Accordingly, a coordinate plane where the ideal datum plane obtained is located is oYZ.

S60. Five parallelism errors are computed according to the first curve, the second curve, the third curve, the fourth curve and the fifth curve by taking the ideal datum plane as a datum.

S70. It is determined that a preset angle β is equal to a standard angle α, and the first splint 4 and the second splint 5 are parallel to the ideal datum plane respectively when all parallelism errors fall within a parallelism tolerance interval. That is, the shank U-shaped member 2 currently tested is qualified.

In this case, the parallelism tolerance interval may be ±0.5 mm.

Further, the step that it is determined that a preset angle β is equal to a standard angle α includes:

The ideal datum plane is taken as a datum, and coordinates of data points of the first curve in the three-dimensional coordinate system are obtained.

A corresponding line segment corresponding to each data point is obtained according to coordinates of the origin and the data points.

An actual included angle corresponding to each data point is computed according to an included angle that is formed between the line segment corresponding to each data point and the X axis.

It is determined that the preset angle β of the base 3 is equal to the standard angle α when differences between all actual included angles and the standard angle α fall within an angle tolerance interval.

In this case, the angle tolerance interval may be ±20'.

According to the present disclosure, the base 3 of the shank U-shaped member 2 is mounted on the magnetic fastener 17 having the standard angle α, such that the surface, far away from the magnetic fastener 17, of the base 3 mounted forms the prediction plane 3-1 that may be measured by the first measurement end 13-1. Based on the real-time distance, measured by the first measurement end 13-1, between the first measurement end and the prediction plane 3-1, the first curve is obtained, and the parallelism error is computed according to a relation between the first curve and the ideal datum plane. It is determined that the prediction plane 3-1 and the ideal datum plane are parallel to each other when the parallelism error falls within the parallelism tolerance interval. In this case, the prediction plane 3-1 is also parallel to the bottom surface of the magnetic fastener 17, that is, the preset angle β of the base 3 and the standard angle α of the magnetic fastener 17 are a pair of alternate interior angles, and the preset angle β is equal to the standard angle α. By determining whether the parallelism error of the prediction plane 3-1 satisfies standards, and then indirectly determining whether the preset angle β of the base 3 satisfies standards, a process of measuring and determining is more simplified.

Similarly, the real-time distances between the second measurement end and the first splint 4 and between the second measurement end and the second splint 5 are measured by the second measurement end 14-1, and the second curve, the third curve, the fourth curve and the fifth curve are obtained accordingly. Four parallelism errors are computed according to relations between the curves and the ideal datum plane. When all the four parallelism errors fall within the parallelism tolerance interval, it is determined that the first splint 4 and the second splint 5 are parallel to the ideal datum plane, that is, the first splint 4 and the second splint 5 are parallel to each other, and the first splint 4 and the second splint 5 are also perpendicular to the prediction plane 3-1 respectively since the prediction plane 3-1 is also parallel to the bottom surface of the fixation seat 1. Compared with a traditional measurement method, the present disclosure is not limited by space, the angle tolerance that is difficult to measure accurately is converted into the parallelism tolerance that is easy to measure, such that whether the angle tolerance satisfies standards is indirectly determined, that is, the angle of the base 3 and the parallelisms of the two splints can be measured quickly, and the condition that the measurement assembly 01 directly comes into contact with the shank U-shaped member 2, and damages the surface of the shank U-shaped member 2 is avoided while making an entire measurement process more convenient and rapid.

What is described above is merely explanation of preferred examples of the present disclosure and applied technical principles. It should be understood by those skilled in the art that the scope of invention involved in the present disclosure is not limited to a technical solution formed by a specific combination of the technical features described above, but should further cover other technical solutions formed by any random combination of the technical features described above or their equivalent features without departing from the inventive concepts, for example, a technical solution formed by interchanging the features described above and (non-limitative) technical features having similar functions as disclosed in the present disclosure.

What is claimed is:

1. A tool for measuring a parallelism and an angle of a shank skeleton of a vehicle crash dummy, comprising:
   a fixation seat, wherein a magnetic fastener is arranged on the fixation seat and configured to mount a shank U-shaped member; the shank U-shaped member comprises a base and a first splint and a second splint that are arranged on the base, the magnetic fastener has a standard angle, and the base has a preset angle; and under the condition that the base is mounted on a surface of the fixation seat, a surface, far away from the fixation seat, of the base forms a prediction plane;
   a measurement assembly, wherein the measurement assembly is provided with a first measurement end and a second measurement end, measurement directions of the first measurement end and the second measurement end are perpendicular to each other, and the measurement direction of the first measurement end is perpendicular to a bottom surface of the magnetic fastener; and
   a movement assembly, wherein the movement assembly is arranged between the measurement assembly and the fixation seat, and the movement assembly is provided with a drive end that is connected to the measurement assembly and configured to drive the measurement assembly to move, so as to change relative positions of the first measurement end and the base and of the second measurement end and the first splint or the second splint.

2. The tool for measuring the parallelism and the angle of the shank skeleton of the vehicle crash dummy according to claim 1, wherein the magnetic fastener comprises:
   a first straight wall, a second straight wall and a third straight wall that are connected in sequence, wherein a first included angle is formed between the first straight wall and the second straight wall, the first included angle is 90°, and an opening of the first included angle faces the third straight wall; and
   a second included angle is formed between the first straight wall and the third straight wall, the second included angle is the standard angle, and an opening of the second included angle faces the second straight wall.

3. The tool for measuring the parallelism and the angle of the shank skeleton of the vehicle crash dummy according to claim 1, wherein the movement assembly comprises:
   a first guide rail, wherein the first guide rail is arranged in a first direction and mounted at a bottom of the fixation seat, and the first direction is arranged parallel to a bottom surface of the fixation seat;
   a first slide block, wherein the first slide block is movably arranged on the first guide rail and configured to mount the measurement assembly; and
   a first drive member, wherein the first drive member is arranged at a side, relatively far away from the fixation seat, of the first guide rail, a drive end of the first drive member is provided with a first screw, the first screw corresponds to and is arranged parallel to the first guide rail, and the first slide block is in threaded connection to the first screw; and
   the first drive member drives the first slide block to move along the first guide rail, so as to change relative positions in the first direction of the first measurement end and the base and of the second measurement end and the first splint or the second splint.

4. The tool for measuring the parallelism and the angle of the shank skeleton of the vehicle crash dummy according to claim 3, wherein the movement assembly further comprises:
   a second guide rail, wherein the second guide rail is arranged in a second direction and mounted on the first slide block, and the second direction is perpendicular to the first direction;
   a second slide block, wherein the second slide block is movably arranged on the second guide rail and configured to mount the measurement assembly; and
   a second drive member, wherein the second drive member is arranged at a side, relatively far away from the first slide block, of the second guide rail, a drive end of the second drive member is provided with a second screw, the second screw corresponds to and is arranged parallel to the second guide rail, and the second slide block is in threaded connection to the second screw; and
   wherein the second drive member drives the second slide block to move along the second guide rail, so as to change relative positions in the second direction of the first measurement end and the base and of the second measurement end and the first splint or the second splint.

5. The tool for measuring the parallelism and the angle of the shank skeleton of the vehicle crash dummy according to claim 4, wherein the measurement assembly comprises:
   a mounting shaft provided with a first end and a second end;
   a first distance measurement member and a second distance measurement member, wherein the first distance measurement member and the second distance measurement member are arranged at the first end, a measurement end of the first distance measurement member is the first measurement end, and a measurement end of the second distance measurement member is the second measurement end; and a third drive member, wherein the third drive member is arranged at a side, close to the fixation seat, of the second slide block, the third drive member is provided with a drive end, and the drive end is connected to the second end; and wherein the third drive member can drive the mounting shaft to rotate around its own axis, such that the second measurement end faces the first splint or the second splint.

6. The tool for measuring the parallelism and the angle of the shank skeleton of the vehicle crash dummy according to claim 5, further comprising:

a limit recess, wherein the limit recess is provided on the third drive member; and a limit protrusion, wherein the limit protrusion is located in the limit recess, and the limit protrusion is connected to a side wall of the mounting shaft, and configured to limit a rotatable angle of the mounting shaft rotating around its own axis.

7. A method for measuring a parallelism and an angle of a shank skeleton of a vehicle crash dummy implemented based on the tool for measuring the parallelism and the angle of the shank skeleton of the vehicle crash dummy according to claim 1, comprising:

driving, by the movement assembly, the measurement assembly to move in a first direction and towards a side close to the fixation seat, measuring a real-time distance between the first measurement end and the prediction plane and outputting a first curve by the first measurement end, and simultaneously measuring a real-time distance between the second measurement end and the first splint and outputting a second curve by the second measurement end, wherein the first direction and a bottom surface of the fixation seat are arranged in parallel;

driving, by the movement assembly, the measurement assembly to move in a second direction and towards a side far away from the base, and measuring a real-time distance between the second measurement end and the first splint and outputting a third curve by the second measurement end, wherein the second direction is perpendicular to the first direction;

causing the measurement assembly to rotate clockwise by 180°, driving, by the movement assembly, the measurement assembly to move in the second direction and towards a side close to the base, and measuring a real-time distance between the second measurement end and the second splint and outputting a fourth curve by the second measurement end;

driving, by the movement assembly, the measurement assembly to move in the first direction and towards a side far away from the fixation seat, and measuring a real-time distance between the second measurement end and the second splint and outputting a fifth curve by the second measurement end;

obtaining an ideal datum plane;

computing five parallelism errors according to the first curve, the second curve, the third curve, the fourth curve and the fifth curve by taking the ideal datum plane as a datum; and determining that the preset angle is equal to the standard angle and the first splint and the second splint are parallel to the ideal datum plane respectively when all parallelism errors fall within a parallelism tolerance interval.

8. The method for measuring the parallelism and the angle of the shank skeleton of the vehicle crash dummy according to claim 7, wherein the obtaining an ideal datum plane specifically comprises:

taking a center of a bottom surface of the magnetic fastener as an origin, taking an extension line that passes the center of the bottom surface of the magnetic fastener and is perpendicular to the first direction and the second direction as an X axis, taking an extension line that passes the center of the bottom surface of the magnetic fastener and is parallel to the first direction as a Y axis, taking an extension line that passes a center of the prediction plane and is parallel to the second direction as a Z axis, and constructing a three-dimensional coordinate system;

obtaining center coordinate points of four bolt holes on the bottom surface of the magnetic fastener from the three-dimensional coordinate system;

computing two ideal datum points according to the four center coordinate points, wherein the ideal datum point is a midpoint coordinate point of a line that is perpendicular to the first direction and the second direction and connects two center coordinate points;

obtaining an ideal straight line according to the two ideal datum points; and obtaining an ideal datum plane according to the ideal straight line.

9. The method for measuring the parallelism and the angle of the shank skeleton of the vehicle crash dummy according to claim 8, wherein the obtaining an ideal datum plane according to the ideal straight line specifically comprises:

obtaining a coordinate plane where the ideal straight line is located from the three-dimensional coordinate system; and extending the ideal straight line in a coordinate axis direction that does not belong to the coordinate plane, and obtaining the ideal datum plane.

10. The method for measuring the parallelism and the angle of the shank skeleton of the vehicle crash dummy according to claim 8, wherein the determining that a preset angle is equal to a standard angle further comprises:

taking the ideal datum plane as a datum, and obtaining coordinates of data points of the first curve in the three-dimensional coordinate system;

obtaining a corresponding line segment corresponding to each data point according to coordinates of the origin and the data points;

computing an actual included angle corresponding to each data point according to an included angle that is formed between the line segment corresponding to each data point and the X axis; and determining that the preset angle of the base is equal to the standard angle when differences between all actual included angles and the standard angle fall within an angle tolerance interval.

* * * * *